United States Patent [19]

Wegner

[11] 4,240,764

[45] Dec. 23, 1980

[54] DISPLAY STRUCTURE

[76] Inventor: Dieter F. Wegner, 11628 N. Shorecliff La., 2 West, Mequon, Wis. 53092

[21] Appl. No.: 938,609

[22] Filed: Aug. 31, 1978

[51] Int. Cl.³ .......................... B25G 3/00; F16B 9/02; F16L 41/00
[52] U.S. Cl. .................................... 403/252; 403/189; 248/243; 248/222.2; 248/220.2
[58] Field of Search .............. 403/233, 234, 237, 236, 403/252, 256, 260, 189, 217, 218; 248/243, 222.2, 220.2, 223.3; 211/182

[56] References Cited

U.S. PATENT DOCUMENTS

| 740,005 | 9/1903 | Gilliland | 248/219.4 |
|---|---|---|---|
| 2,941,855 | 6/1960 | Weill | 403/237 |
| 3,281,102 | 10/1966 | Hobson | 248/243 X |
| 3,471,182 | 10/1969 | Schroer | 403/264 X |
| 3,915,579 | 10/1975 | Offenbroich | 403/264 |

FOREIGN PATENT DOCUMENTS 1011738  6/1952  France ........................................ 52/657

*Primary Examiner*—Wayne L. Shedd
*Attorney, Agent, or Firm*—Wheeler, Morsell, House & Fuller

[57] ABSTRACT

A display structure having a vertical post and a horizontal rail. The post has a salient side wall with a socket opening therein. The rail has a notched end with a peg projecting therefrom and engaged through the socket opening, thus to support the rail from the post with the notched end of the rail embracing the salient side wall of the post and preventing the rail from twisting with respect to the post.

10 Claims, 19 Drawing Figures

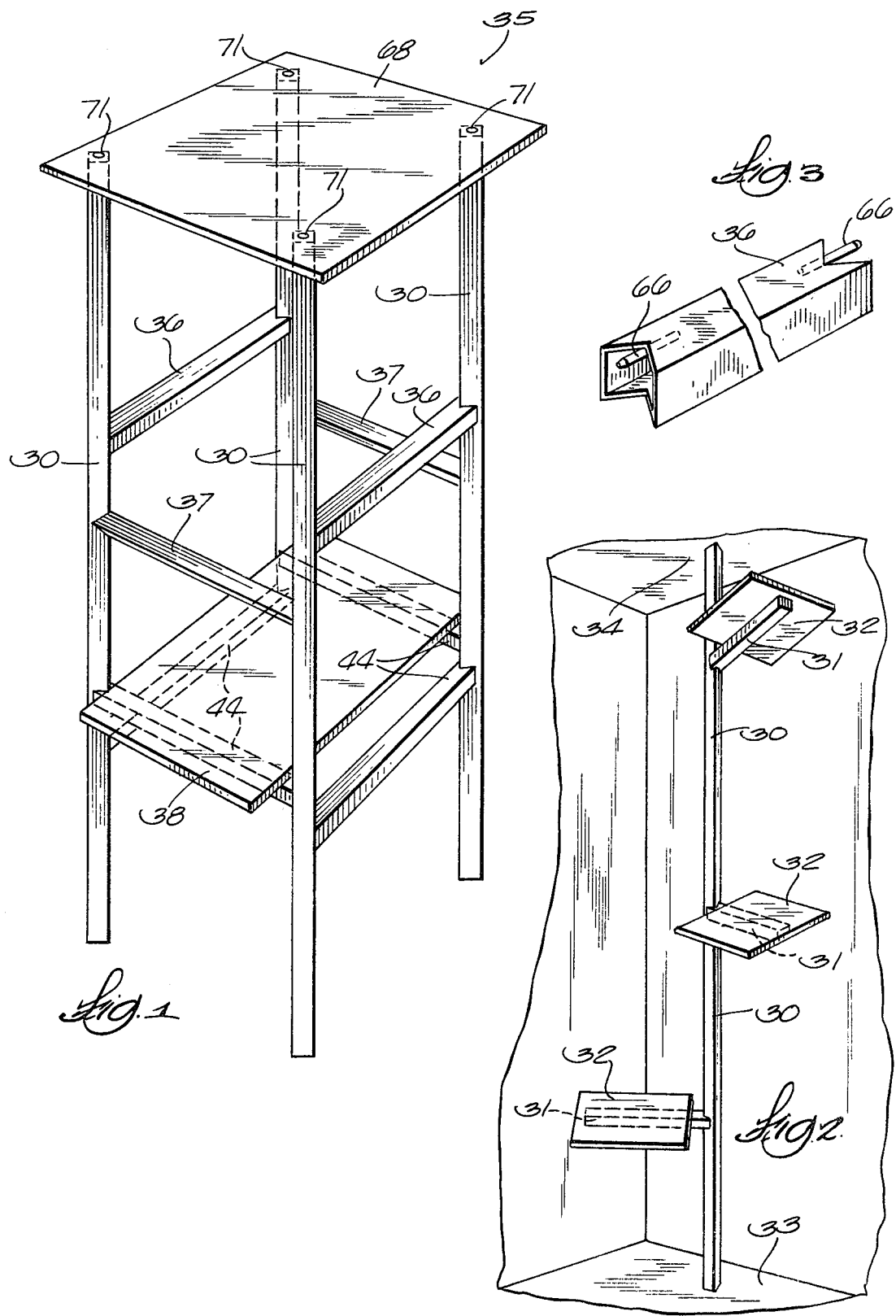

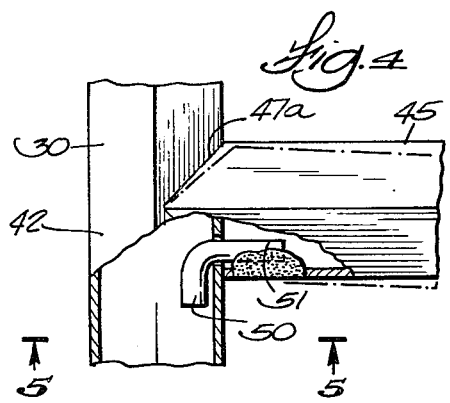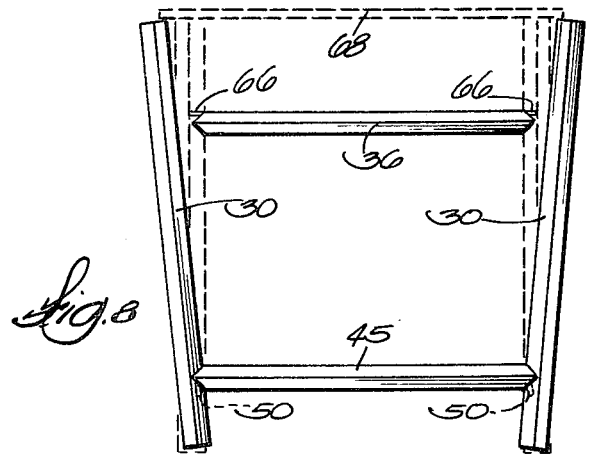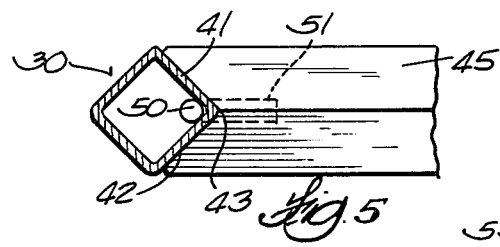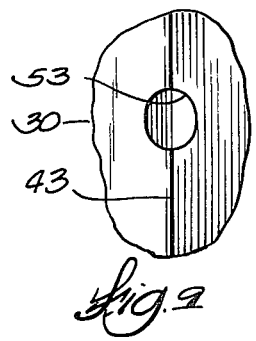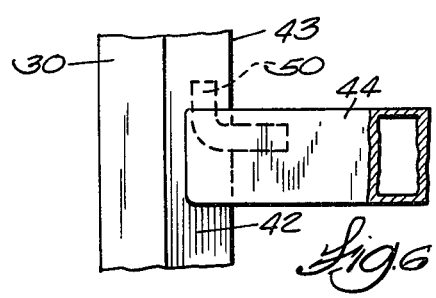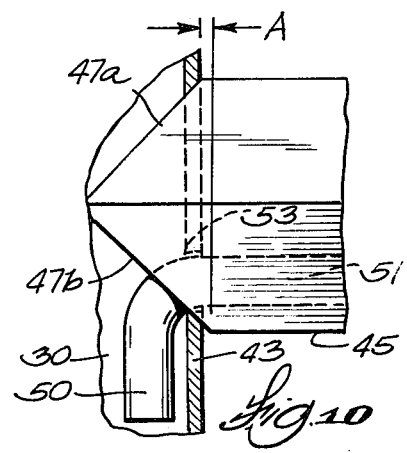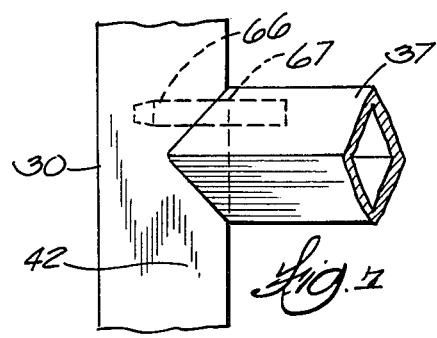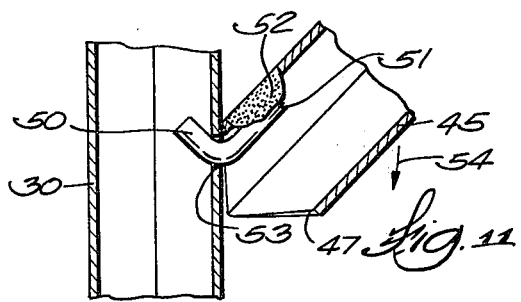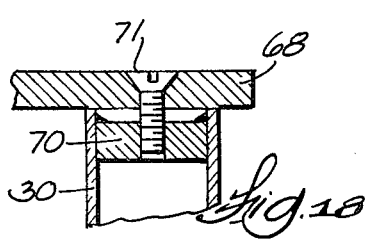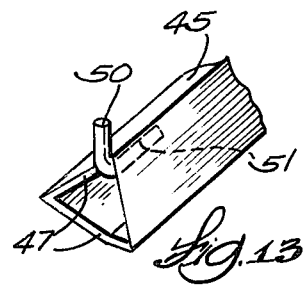

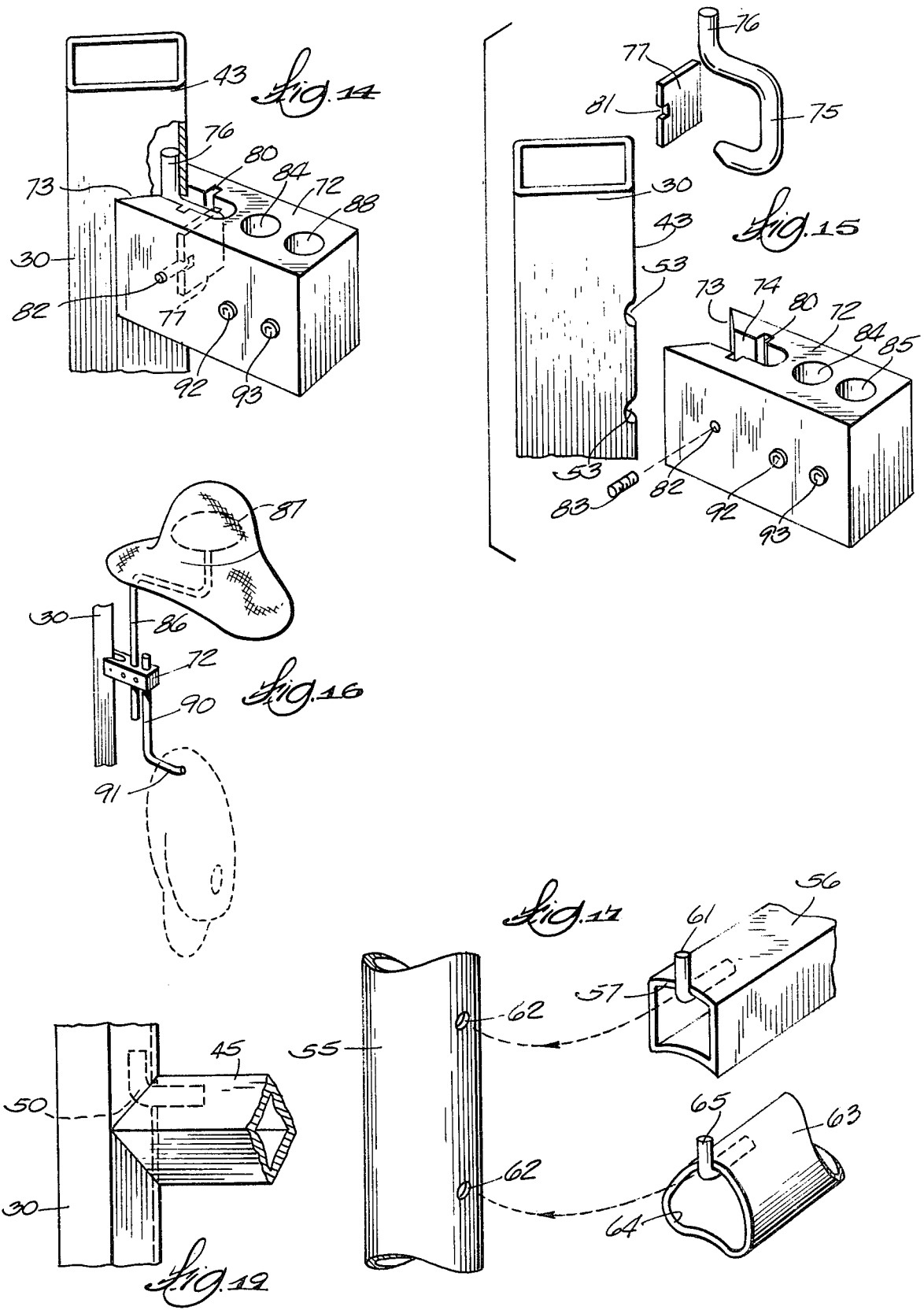

DISPLAY STRUCTURE

BACKGROUND OF THE INVENTION

Display rack or shelf structures typically have vertical posts and horizontal rails. The rails often function a stretchers between posts, and may also support shelves. In the typical structure, metal rails are welded or bolted to metal posts. Interlocking tongue and groove connections between the rails and the posts have also been proposed, such as shown in U.S. Pat. Nos. 1,320,982; 2,925,181; 3,045,834; 3,529,857; 3,724,678 and 3,963,290.

In all of these patents (except U.S. Pat. No. 3,529,857), the rails have a flat surface which butts against a flat surface of the post. The surfaces themselves do not interlock and any tendency for the rail to twist with respect to the post must be restrained by other structure. In U.S. Pat. No. 3,529,857, a flattened end of one tube is received in a slotted socket formed in another tube. There are no butted interlocking surfaces.

SUMMARY OF THE INVENTION

In accordance with the present invention, abutting surfaces of the post and rail are configured to provide an interlock therebetween. Specifically, the post has a salient side wall and the rail has a notched end which embraces the salient side wall of the post so that the rail and post are interconnected in such a manner that the rail cannot twist with respect to the post. Moreover, the post has a socket, and the rail has a peg projecting from the root of the rail notch. The peg engages through the socket opening in the post to support the rail from the post.

A single post and a single rail can be interconnected in cantilevered relation, in one embodiment of the invention. In other embodiments, a rack may be assembled from multiple posts and multiple rails. One or more of the intersections between such posts and rails will incorporate interlocking surfaces incorporating the invention.

In embodiments of the invention in which there are multiple posts, a rail notch may be shallower at one side of the rail than at its other side. The rail is interlocked with the post in a swinging motion pursuant to which the shallower side of the notch contacts the post before the rail is perpendicular to the post. Further movement of the rail into perpendicularity with the post introduces stress into the joint between the post and the rail, thus to bind the post and the rail firmly together without looseness or rattling.

Interlocked joints according to the present invention present an attractive appearance in which the post and rails appear to be unitary. There are no visible means of interconnection therebetween.

Other objects, features, and advantages of the invention will appear from the disclosure hereof.

DESCRIPTION OF THE DRAWINGS

FIG. 1 is a perspective view of a display or shelving rack embodying the invention.

FIG. 2 is a perspective view of a single post having one or more horizontal rails cantilevered therefrom in another embodiment of the invention.

FIG. 3 is a fragmentary perspective view of one rail embodiment suitable for use in the invention.

FIG. 4 is a side elevation, partly in cross section through another embodiment of interconnected post and rail suitable for use in the invention.

FIG. 5 is a cross section taken along the line 5—5 of FIG. 4.

FIG. 6 is a side elevation similar to FIG. 4, but showing a different form of rail embodying the invention.

FIG. 7 is a side elevation similar to FIG. 4, but showing another form of rail embodying the invention.

FIG. 8 is a diagrammatic view illustrating the technique for introducing tension into the connection between a rail and two posts embodying the invention.

FIG. 9 is a fragmentary elevation showing the configuration of a socket opening through the salient wall of a post.

FIG. 10 is a fragmentary view partly in elevation and partly in cross section, showing an interconnection between a post and rail embodying the invention.

FIG. 11 is a vertical cross section taken through a post and rail embodying the invention and showing the rail in the course of swinging it into interlocking connection with the post.

FIG. 12 is a fragmentary perspective view showing another embodiment of rail suitable for use in the invention.

FIG. 13 is a fragmentary perspective view showing another embodiment of rail suitable for use in the invention.

FIG. 14 is a perspective view in which a portion of the post has been cut away and shown in section and illustrating another embodiment of the invention in which the peg is detachably connected with the rail.

FIG. 15 is an exploded view of the structure shown in FIG. 14.

FIG. 16 is a diagrammatic view exemplifying use of the structure shown in FIG. 14.

FIG. 17 is a fragmentary perspective view showing still further embodiments of the invention.

FIG. 18 is a fragmentary cross section through the joint between the top of a post and a shelf or top plate for a rack structure.

FIG. 19 is a side elevation showing the structure of FIG. 11 after the rail has been swung to a position perpendicular to the post.

DESCRIPTION OF THE PREFERRED EMBODIMENTS

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

A simple form of the invention is shown in FIG. 2 in which a single post 30 supports a series of cantilevered horizontal rails 31, each of which carries a shelf 32 for the display of merchandise or the like. The post 30 is illustrated in FIG. 2 as extending between the floor 33 and ceiling 34 of a room. However, the post 30 could simply be one post of a free-standing rack such as is shown in FIG. 1.

FIG. 1 shows four similar posts 30 at the respective corners of a free-standing rack 35 having horizontal rails 36, 37, 44 which function as stretchers to hold the posts 30 in spaced relationship and which may also function as supports for shelves 38.

An important feature of the invention is that the posts and rails are so related that the rail intersects the post at a salient side wall thereof. The term "salient side wall" is meant to distinguish from the prior art typical arrangement in which a flat surface of a post will intersect the flat surface of a rail, as previously explained. However, in accordance with the present invention, posts 30 having a square or rectangular or other polygonal cross section are turned at an angle to their normal orientation so that two flat sides 41, 42 of the post intersect at a corner 43 which faces the end of the rail, as illustrated in the drawings, for example, in FIG. 5. Thus, the corner 43 is characterized as a salient side wall in that it constitutes a projecting ridge about which a notch in the end of the rail will fit.

FIGS. 12 and 13 show two embodiments of rails 44, 45, each made from square section metal tubing and having at least one notched end. Where only one end is notched, the rail would be suitable for cantilevered support from a post, as shown in FIG. 2. Where both rail ends are notched, the rail would be suitable for use in a free-standing rack, as shown in FIG. 1. Rail 44 of FIG. 12 has its flat sides horizontally and vertically oriented, whereas rail 45 of FIG. 13 has its sides obliquely oriented to the vertical and the horizontal. However, in both cases, one or both ends of the rail is notched.

Specifically, rail 44 of FIG. 12 has its horizontal upper and lower sides provided with notches 46 which intersect at an angle so as to embrace the salient corner 43 of post 30 as shown in FIG. 6. Where the post is square in cross section, said angle is 90°. Accordingly, the salient corner 43 of post 30 will nest snugly into the rail notch 46, as shown in FIGS. 1 and 5, so that when the post and rail are interlocked together, the rail cannot twist out of its interlocked position.

The rail 45 of FIG. 13 is provided with a similar end notch 47, thus disposing portions of the oblique side walls of the rail 45 in embracing relationship to the side walls 41, 42 of the post 30, as shown in FIGS. 4 and 5. As in the case of rail 44, the notched end of the rail 45 embraces a salient side wall of the post to prevent twisting of the rail with respect to the post when they are interlocked together.

Cantilevered rails 31 of FIG. 2 are also provided with notched ends, as shown in FIG. 12.

Rails 31, 44, 45 are provided with pegs which in these embodiments comprise vertically projecting hooks 50. Each hook 50 has a shank 51 bent 90° from the hook 50 and which is welded at 52 (FIG. 11) or is otherwise securely fastened to the rail. Hook 50 projects from near the root of the rail end notch and thence vertically to hang the rail from the post.

Posts 30 have socket openings 53 (FIGS. 9 and 10) in the corner 43 of the post 30. Socket openings 53 are slightly elongated or oblong in the vertical direction. Rails 31, 44, 45 may be interconnected with the post 30 in the manner indicated in FIG. 11 in which the hook 50 extends upwardly and the rail is first inclined at an angle to the post and the hook 50 is engaged through the socket 53 as illustrated in FIG. 11. The rail is then swung in the direction of arrow 54, to bring it into its position shown in FIG. 19 in which the shank 51 of the hook 50 rests on the edge of socket opening 53 and the hook 50 is inside of the hollow post 30 and engages with the side walls 41, 42, in the manner shown in FIG. 5, thus to interlock the rail 45 with the post 30. The rail hook 50 and post socket 53 are concealed from view when the posts are interconnected. No welds, bolts, or other fastening means are exposed to view, and the parts give the visual appearance of flowing together in a unitary and attractive assembly. Moreover, the rail is precluded from twisting with respect to the post because of the interlock between the notched end of the rail with the salient side wall of the post.

The same technique is utilized to interconnect the rail 44 of FIG. 12 and the rail 31 of FIG. 2 with the post 30, as shown in FIGS. 6 and 2.

FIG. 17 shows a modification in which the post 55 comprises a vertical tube having a cylindrical surface which also provides a salient side wall to receive the notched ends of rails such as 56, 63, which embrace the salient side wall of the post. In FIG. 17, a square cross section rail 56 having a curved notch 57 is illustrated. A hook 61 is connected to the rail 56 and is received through a socket opening 62 in the post 50.

FIG. 17 also shows a tubular cylindrical rail 63 having a curved notch 64 with a hook 65 similarly receivable through a socket opening 62 in the post 55. In these embodiments, the notched ends of the rails 56, 63 embrace the salient side wall of post 55 to prevent twisting of the rail with respect to the post.

The rail 36 of FIG. 3 is provided with a peg which in this embodiment comprises a longitudinally extending prong 66, instead of a vertically extending hook 50 of the previously described rail embodiments. Rail 36 is otherwise similar to rail 44 of FIG. 12. FIG. 7 illustrates a rail 37 which has a peg comprising a longitudinally extending prong 66, instead of a vertically projecting hook 50. Rail 37 is otherwise similar to rail 45 of FIG. 13. The rails 36, 37 having the longitudinally extending prongs 66 are connected to the post through a circular socket opening 67 in the salient corner 43 of the post 30, as shown in FIG. 7. In these embodiments, the rails with the longitudinally extending prongs 66 could not be used for a cantilevered support from a single post 30, as shown in FIG. 2, because nothing would prevent the rails from detaching from the post. The cantilevered arrangement requires a hook 50.

FIG. 8 illustrates a technique for introducing stress into the interconnection between hooked rails and spaced upstanding posts, thus to eliminate play or rattling between the rail and the posts. In this embodiment the rail 45 is oriented with its hooks 50 projecting downwardly, instead of upwardly, as is also shown in FIGS. 4 and 10. For stress introducing purposes, the portion 47a of notch 47 near the top of the rail 45 as shown in FIG. 10 is made slightly shallower than the portion 47b of the notch 47 at the bottom of the rail 45 as shown in FIG. 10. This difference in depth of the notch is indicated by dimension A in FIG. 10. Accordingly, when rail 45 of FIG. 10 is swung from its broken line to its full line position as shown in FIG. 4, the notch portion 47a will contact the salient side wall of the post 30 before the rail has come into perpendicularity with the post. In order to bring the rail into its full line position shown in FIG. 4, additional pressure must be imposed on the rail. This will introduce tension and stress into the interconnection therebetween the rail and the post. If held in its full line position shown in FIG. 4, the rail parts will retain this stressed condition, thus eliminating play, wobble or rattling between the rail and the post.

One technique for introducing such stressed condition is illustrated in FIG. 8. Here, two posts 30 are shown in full line position partially engaged with a horizontal rail 45. In the full line showing in this figure, the posts have not yet been moved into perpendicularity with the rail 45. However, in the broken line position of posts 30, perpendicularity has been achieved and stress introduced into the connection between the posts 30 and rail 45. At this point, the ends of posts 30 remote from rail 45 are tied together, as by shelf 68 (see also FIGS. 1 and 18) to maintain the stressed condition of the junction between rail 45 and posts 30. This maintains the posts 30 in their broken line position shown in FIG. 8 in which stress is maintained on the joint between posts 30 and rail 45. In the technique illustrated in FIG. 8, the posts 30 are used as levers to force them into perpendicularity with the rail 45 and produce the stressed condition aforesaid.

In assembling a rack 35 as shown in FIG. 1, only the bottom rails 44 have vertically projecting hooks 50. The other rails 36, 37 have longitudinally extending prongs 66. The rack may be provided with a flat top shelf 68 which is anchored to the upper ends of the posts 30 in any convenient manner, for example, as shown in FIG. 18. The upper open ends of the post 30 may be provided with an interior tapped nut 70 to which the upper plate or shelf 68 is releasably attached by screws 71.

FIGS. 14, 15 and 16 show a modification in which a horizontal rail 72 is provided with a notch 73 which embraces the salient corner 43 on the post 30 as hereinbefore described. However, in this embodiment, the root of notch 73 opens into a socket 74 which detachably receives the shank 75 of a peg such as upstanding hook 76. Hook shank 75 is U-shaped and is releasably secured in the socket 74 by a locking plate 77 which is received in a cross slide 80 formed in the walls of socket 74. Plate 77 is embraced by the U-shaped hook shank 75. When plate 77 is received in its cross slot 80, a notch 81 along one of the plate edges will align with a tapped hole 82 in the side wall of the rail 72. Lock screw 83 threaded through the tapped hole 82 will engage with the plate notch 81 to lock the plate 77 in position in its cross slot 80 and correspondingly lock the hook shank 75 in socket 74.

Hook 76 is received in socket 53 of post 30 in the manner suggested in FIG. 11, the ultimate interlocked position of the parts being shown in FIG. 14.

Rail 72 is thus supported by the post 30 and is designed to carry merchandise for display as exemplified in FIG. 16. Rail 72 has several vertical sockets 84, 85. Socket 84 may receive the shaft 86 of hat stand 87, for example, and socket 85 may receive the shank 90 of a cap hook 91, for example. The respective shanks 86, 90 are secured in position within the sockets 84, 85 by lock screws 92, 93.

Whether or not the rails 31, 44, 45 with bent hooks 50 have asymmetric end notches shallower at one side than at the other depends upon the ultimate use of the rails. Where the rail is to be cantilevered, as are rails 31 of FIG. 2, there is no need to introduce stress into the joint, and the notch is symmetrical. However, in a freestanding shelf structure as in FIG. 1, it may be desirable to stress the joints between posts 30 and rails 44, 45, in which event the rails would be provided with asymmetric end notches, as shown in FIGS. 4 and 10.

Where the rail is cantilevered, as is rail 31 of FIG. 2, the rails should be oriented with bent hooks 50 projecting upwardly, thus to support the rail from the post as shown in FIG. 6. Where the rail spans between two posts, as in FIG. 1, the rails may be oriented with their bent hooks 50 projecting either upwardly or downwardly. However, if stress is to be induced in the joint, as in a rail with asymmetric notches as shown in FIGS. 4 and 10, the rails should be oriented with their bent hooks 50 projecting downwardly, to enable assembly as shown in FIG. 8. As the posts 30 are swung toward each other from their full toward their broken line positions in FIG. 8, the rails 36, 37 with longitudinally projecting pegs, such as prong 66 of FIG. 3, may readily be assembled with the posts 30.

I claim:

1. In a display structure having a vertical post and a horizontal rail having an open end, the improvement for releasably interconnecting the post and rail and comprising said post having a salient side wall, said rail having a mating notched end, a socket opening in the salient side wall of the post and a fixed peg projecting from the rail into said notch and said peg having a shank portion supported in the open end of said rail and offset from the center thereof, and a hook portion releasably engaged through said socket opening, said socket opening being slightly oblong in the longitudinal direction of said post to accommodate swinging movement of the hook, with the juncture of said hook portion and shank portion being located within the confines of said notch and said juncture being spaced from the apex of the notch a distance only slightly greater than the wall thickness of the vertical post and positioned close to one side of said rail to enable swinging the rail into an angularly related relationship with respect to the post to support the rail from the post with the notched end of the rail interlockingly embracing the salient side wall of the post to prevent twisting of the rail with respect to the post about said fixed peg but for the interlocking of said notched end with the salient side wall of the post.

2. The device of claim 1 in which the salient side wall of the post comprises an angular corner having flat sides, said notched end of the rail having flat sides meeting at an angular corner.

3. The device of claim 1 in which the salient side wall of the post is curved, said notched end of the rail having matching curved sides.

4. The device of claim 1 in which the notch is shallower at one side of the rail than it is at the other side of the rail whereby the other side of the notch contacts the post before the rail is perpendicular to the post, thus to stress the joint between the post and rail as the rail is swung about the hook into perpendicularity with the post and bind the post and rail firmly together, and means to hold the post and rail in stressed assembly.

5. The device of claim 1 in which said shank is welded to the inside surface of said rail.

6. The device of claim 1 in which said shank portion is removably received in a socket in said rail, and a locking key between the shank and rail.

7. The device of claim 6 in which said locking key comprises a flat plate, said rail having a slideway removably receiving said plate in interlocking engagement with the shank of the hook.

8. In a display structure having a plurality of vertical posts and at least one hollow horizontal rail having an inside surface for the outer wall, the improvement for releasably interconnecting the post and rail and comprising said posts having a salient side wall, said rail having a notched side with the notch at one end being shallower than the notch at the other side to require force to align the post and rail at right angles, a socket opening in the salient side wall of the posts and a fixed peg having a shank portion supported on said inside surface and having a hook portion extending generally at right angles, with said shank portion projecting from the rail into said notch and releasably engaged through said socket opening to support the rail from the post with the notched end of the rail interlockingly embracing the salient side wall of the post, said socket opening being sized only slightly larger than the diameter of said fixed peg to enable swinging of said hook portion into said socket and to prevent twisting of the rail with respect to the post about said fixed peg but for the interlocking of said notched end with the salient side wall of the post, and tie means connected between said posts at a point spaced from said rail to hold the post and rail joints in stressed connection at generally right angles.

9. In a display structure having a plurality of vertical posts and horizontal rails, the improvement for releasably interconnecting said posts and rails and comprising said posts, each having a salient side wall and rails having notched ends, socket openings in the salient side walls of the post and said fixed pegs projecting from the rail into said notch and releasably engaged through said socket openings to support the rail from the post, with the notched end of the rail interlockingly embracing the salient side wall of said post, and wherein at least one of said horizontal rails has pegs with a hook portion hooked into said sockets and with the notch at one side of the rail being shallower than at the other side of the rail, requiring the application of stress to align the post and rail at a generally right angle, and tie means connected to said posts to hold the rails with shallow notches and the interfitting posts in stressed assembly at right angles whereby to provide a relatively rigid post and rail assembly and to prevent twisting of the rails with respect to the posts.

10. A display structure in accordance with claim 9 wherein said tie means to hold the rails in stressed assembly comprises a shelf connected to the posts at a point remote from the stressed conditions.

* * * * *